United States Patent [19]

Pitcher

[11] Patent Number: 5,680,101
[45] Date of Patent: Oct. 21, 1997

[54] FORWARD FACING BRAKE LIGHT

[76] Inventor: Laurence S. Pitcher, 5160 Park Vista Blvd., Colorado Springs, Colo. 80918

[21] Appl. No.: 105,956

[22] Filed: Aug. 12, 1993

[51] Int. Cl.$^6$ ................................................. B60Q 1/44
[52] U.S. Cl. ........................... 340/479; 340/463; 340/468; 340/471
[58] Field of Search ............................. 340/479, 467, 340/463, 468, 464, 436, 471

[56] References Cited

U.S. PATENT DOCUMENTS

| | | | |
|---|---|---|---|
| 2,733,311 | 6/1956 | Brown | 340/468 |
| 2,831,176 | 4/1958 | Liberto | 340/468 |
| 4,970,493 | 11/1990 | Yim | 340/463 |
| 5,258,740 | 11/1993 | Viano et al. | 340/463 |
| 5,400,225 | 3/1995 | Currie | 340/468 |

OTHER PUBLICATIONS

J.C. Whitney & Co. Catalog 555j 1993 p. 66.

*Primary Examiner*—Jeffery Hofsass
*Assistant Examiner*—Nina Tong

[57] ABSTRACT

A light of standard color is illuminated when the braking means of a vehicle is applied. The light is extinguished when the braking means are released. The light is located on the forepart of a vehicle preferably in the mid-line, facing in a forward direction the light beam emanating therefrom projecting towards the front of a vehicle, and is so placed at or above dash-board level so as to be clearly visible to other vehicles or persons facing said vehicle or through the rear view mirror if such an equipped vehicle is approaching from behind. The forward facing brake light is one in number to avoid confusion with standard double or multiple rear brake lights and is visible both day and night when brakes are activated.

5 Claims, 4 Drawing Sheets

FORWARD FACING BRAKE LIGHT

BACKGROUND OF THE INVENTION

(1) Field of the Invention

The present invention relates to devices that are used to indicate whether a motorized vehicle, two, three, four, or more wheeled in nature, has applied its brakes thus indicating intention to slow or stop said vehicle.

The forward facing brake light relates to electrically operated devices and wiring. It relates to a vehicles electrical system in such a manner that when the braking pedal or other braking means is applied a light located in the forepart of a vehicle is illuminated. The light is also so configured such that when said braking means is released the light is extinguished.

(2) Description of Prior Art

The inventor, through development of his own original concept, arrived at the herein presented and described device. Lights signals, etc., have long been known to indicate the application of brakes on various vehicles from behind. There is, however, prior art that has been applied as relates to forwardly visible signals of braking from the forepart of the braking vehicle.

Brown in U.S. Pat. No. 2,733,311 describes a "vehicle crossing signal" which is activated independently of the brake pedal switch itself, apparently with the purpose of signalling pedestrians or vehicles that the brakes have been applied.

Viano et al teaches us in U.S. Pat. No. 5,258,740 of an "acceleration/deceleration" system "visible from at least one side." This is accomplished through sensors (one of which being the braking system) which are to indicate whether a vehicle is "accelerating, coasting, or braking."

Currie in U.S. Pat. No. 5,400,225 demonstrates a different method of displaying rearward braking using a fiberoptic system.

The lighting system as describe by Yim in U.S. Pat. No. 4,970,493 is a combination of lights that indicate braking, acceleration, coasting, from a single light from the rear.

Liberto in U.S. Pat. No. 2,831,176 teaches of a "courtesy light" and, though it is in the mid-line of the vehicle, it is separately switched from the braking system.

The forward facing brake light, though touching on these and perhaps other "brake light patents" improves on the various systems by indicating braking only and providing full forward visibility range. It further enhances brake warning systems by being an extension of the standard rear brake light system thus avoiding confusion.

SUMMARY OF THE INVENTION

An unique application of a long existing concept is herein presented that in the inventors opinion, if employed widely in motorized vehicles of various types, would greatly increase the safety of the individuals that use such vehicles and indeed could save hundreds, perhaps even thousands, of lives on travel lanes both in this country and abroad. The unique application and placement of a long known and used signaling system is herein described to indicate by visual means if an "oncoming" vehicle has or has not applied its brakes.

This light, the color of which is to be common to all vehicles, is placed visibly on the front of motorized vehicles and is similar in form to the "third" rearward facing brake light now standard in most new automobiles. Said light is activated when the braking means of the vehicle is applied and is connected with the standard rearward facing brake lights of the vehicle. The light is connected in such a manner that it is not interrupted by the application of right or left turn signals and stays on as long as the brakes are applied. When the brakes are released the light goes out.

The exact placement of the forward facing brake light on the forepart of a vehicle could vary but should be in a relatively standard location such as in the vertical midline of the vehicle, at or above dashboard level, the emanant light beam therefrom is clearly visible from the front of the vehicle and visible laterally to at least 45 degrees from the vehicles mid-line so all operators of approaching vehicles and pedestrian persons will easily visualize its illumination of lack thereof and understand tis function indicating that said vehicles brakes have or have not been applied.

BRIEF DESCRIPTION OF THE DRAWINGS

The specification contains four pages of drawings, FIGS. 1, 2, 3, and 4.

FIG. 2. Is a rendering of the forward facing brake light housing illustrating the form of the dash mounted unit and is a representation of the parts there-of.

DESCRIPTION OF THE PREFERRED EMBODIMENTS

Figure 1:
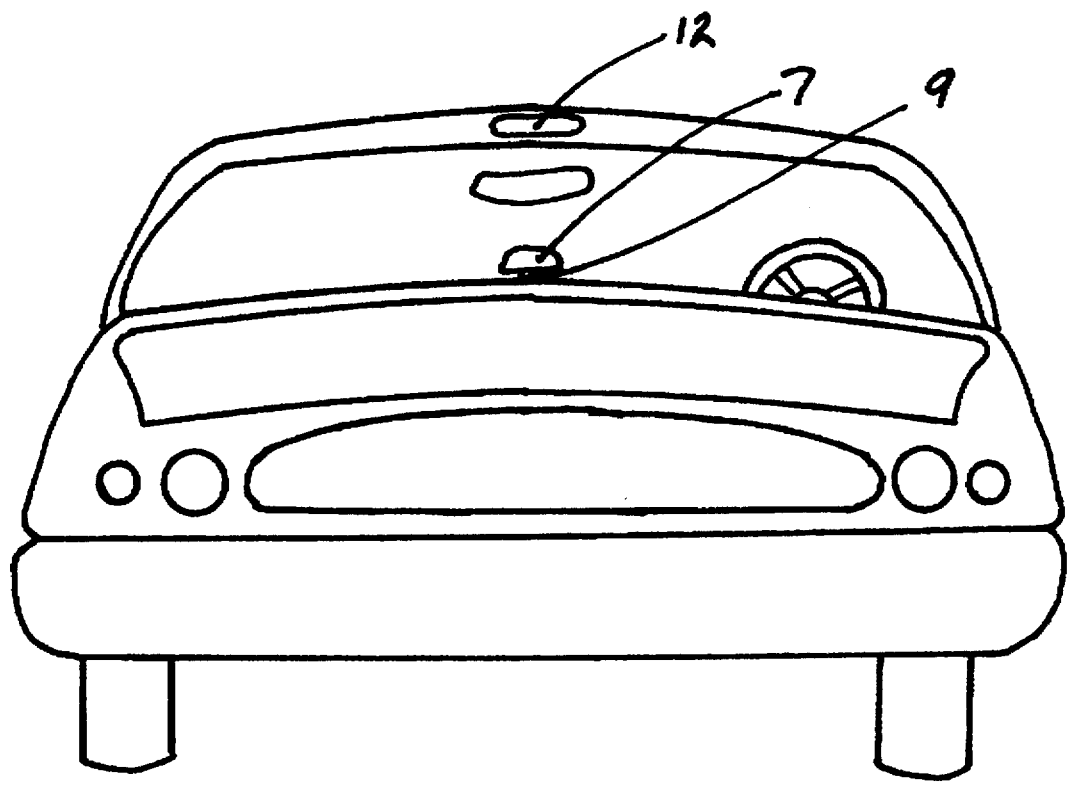
FIG. 1. Illustrates the placement of the forward facing brake light in the most likely common location viewed from the front on an automobile.
Figure 2:
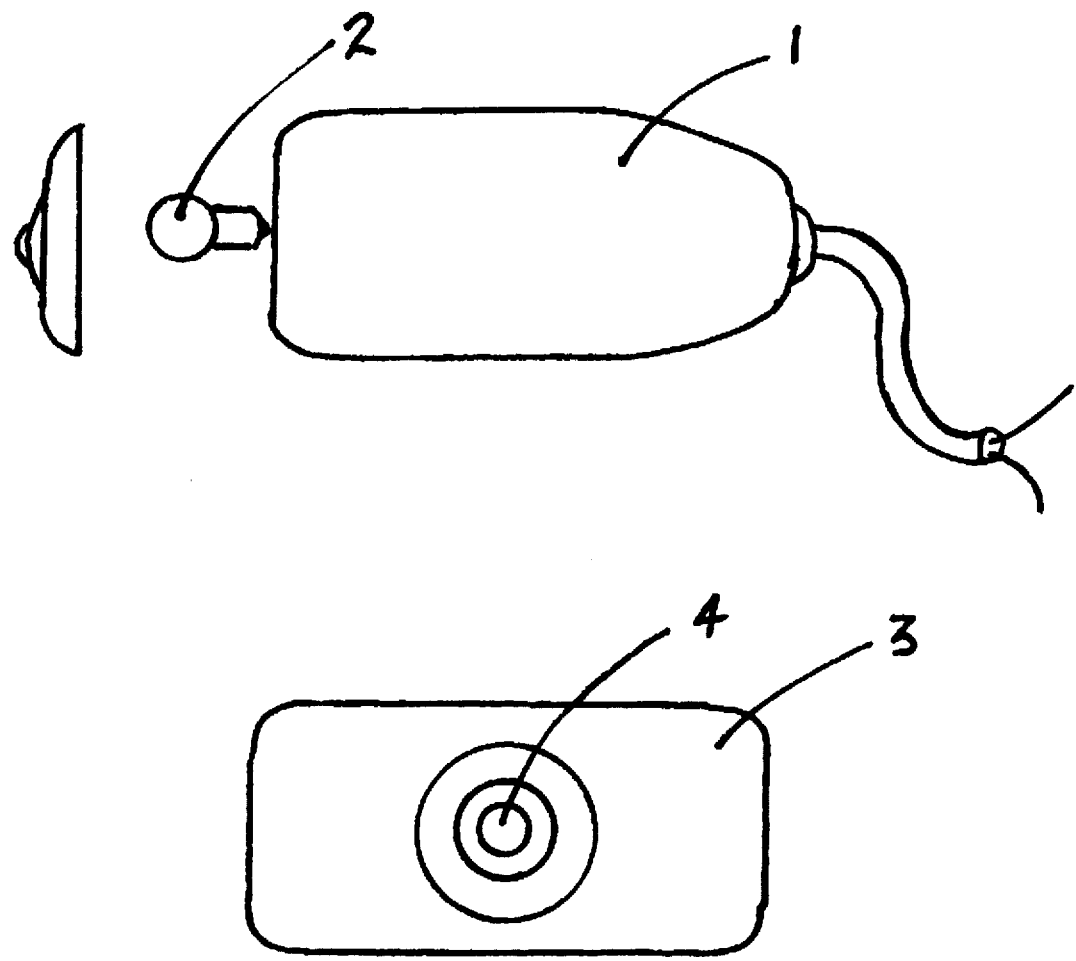
Figure 3:
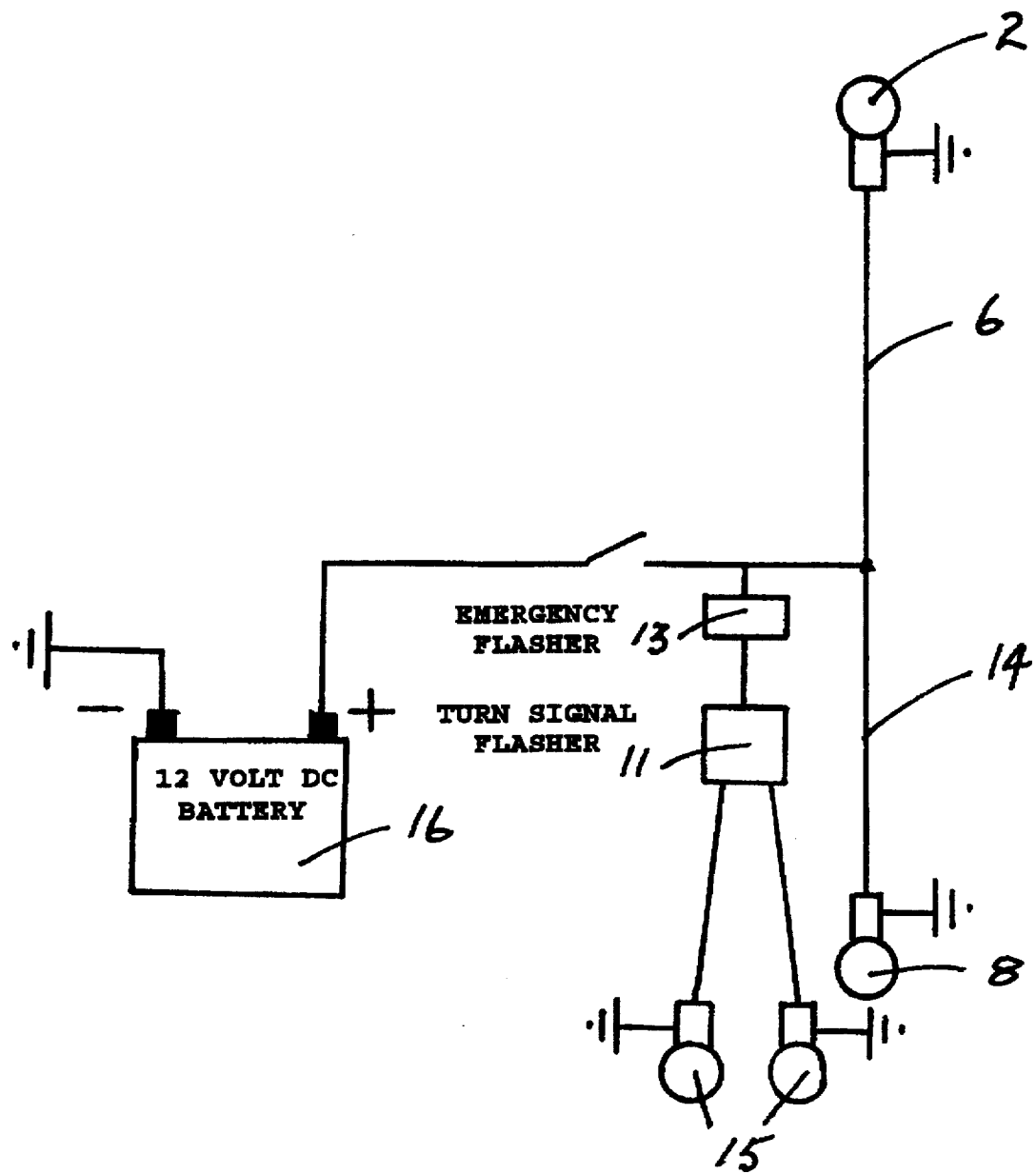
FIG. 3. Is a schematic diagram of the likely internal wiring of the unit when it is used in a motorized vehicle.
Figure 4:
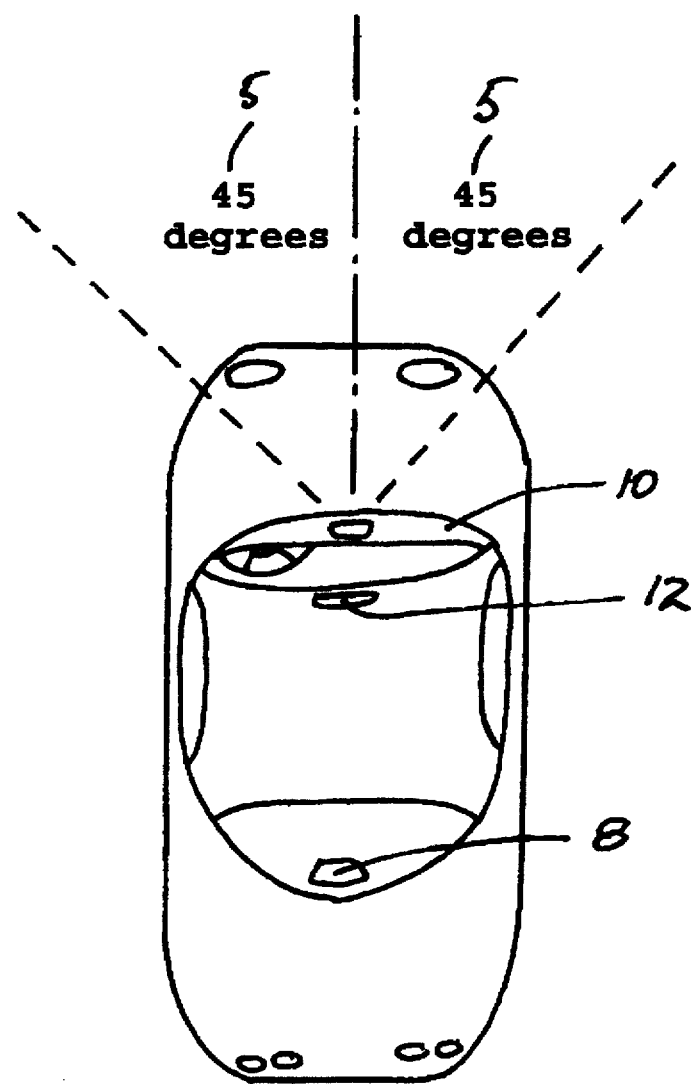
FIG. 4. Illustrates the placement of the forward facing brake light in the two most likely locations from a top view and illustrates its minimum with of visibility.

The single forward facing brake light is to be comprised of an opaque enclosed housing (FIG. 2, 1) that encloses a light bulb (FIG. 2, 2) therein on all sides save the front. The light bulb within the housing is a 12 volt DC standard brake light bulb. The front of the opaque housing is covered with a translucent facing (FIG. 2, 3). The center of that translucent facing (FIG. 2, 4) being in the form of a lens and so designed that the light emanating from the electric bulb within the housing and projecting forward in relation to a vehicle through said lens may be seen from the front of a vehicle centrally and from at least 45 degrees laterally (FIG. 4, 5) from the center of said lens. Said light is visible from at least a quarter of a mile during daylight conditions. The light bulb (FIG. 3, 2) is connected to a vehicles electrical brake light system (FIG. 3) via an electrical wire (FIG. 3, 6). The favored embodiment of the forward facing brake light is in the mid-line of a vehicle just above the instrument panel (FIG. 1, 7) and placed on what is commonly called the "dash-board" (FIG. 4, 10) of a vehicle. It is visible through the front window, a position analogous to the "third" brake light (FIG. 4, 8) in the rear window of most new automobiles. The forward facing brake light in this case is mounted (FIG. 1, 9) with a base affixed to the dashboard (FIG. 4, 10). Another favored location is built into the frame that surrounds the windshield (FIGS. 1 & 4, 12), again being placed in the mid-line of a vehicle. The added height increasing visibility from a distance and in irregular terrain. The forward facing brake light is, however, standardized in the mid-line position so when utilized it is readily recognized by all drivers for its indication of brake application.

The size and configuration of the light would be similar to the "third" center mounted rearward brake light, though perhaps somewhat smaller in size to avoid visual obstruction of the vehicles operator. The form of the light is not critical other than it should not be so large as to distract the operator or oncoming traffic and should not glare excessively in the interior of the vehicle.

The color of the emanant light via its colored lens is universally the same. The unit is built into a vehicle as a manufacturers feature or is easily retro-fitted to existing vehicles.

The electrical bulb operates on 12 volt DC (FIG. 3, 6) or is otherwise compatible with the voltage of a vehicles electrical operating system and is connected (FIG. 3) to the standard rear "third" brake light switch (FIG. 3, 14) or brake light operating system. It is connected so as to operate when the rear brake lights (FIG. 3, 15) are on, operate in conjunction with the rear "third" brake light (FIGS. 3 & 4, 8), and function in such a manner as to not be affected by the operation of the turn signal flasher unit (FIG. 3, 13), or emergency flasher unit (FIG. 3, 11) and, upon application of braking means, glow continuously until such braking means are disengaged.

I claim:

1. A forward facing brake light apparatus comprising a light located in the midline of the forepart of a motorized vehicle being illuminated when a vehicles brake is applied comprising:

wherein said apparatus comprising a light bulb in an opaque enclosed housing with a translucent facing;

a wire means with which to connect the apparatus to an electrical system of said vehicle;

a mounting means with which to affix the apparatus to a dashboard of said vehicle;

a built in means in which the apparatus is placed in said vehicle at the time of manufacture of said vehicle;

wherein the opaque housing surrounds a light bulb on all sides save the front;

wherein said translucent facing on the front of said opaque housing is in the form of a lens to concentrate and direct forward the light while at the same time allowing visibility laterally to an angle of at least forty five degrees from straight forward, and mounting means is located on the forepart of said vehicle and so positioned to be clearly visible from the front of said vehicle and from forty five degrees to either side of the forward midline of said vehicle;

wherein a manufacturer will build in its placement visibly, in the midline of said vehicle above dashboard, or in the frame surrounding a front windshield;

wherein the brightness of the bulb is sufficient to be seen for a distance of one quarter of a mile in daylight.

2. A forward facing brake light apparatus as described in claim 1 wherein the translucent facing is of universal color.

3. A forward facing brake light apparatus as described in claim 1 wherein the light bulb is 12 volt DC or of the same voltage as the electrical system of a vehicle if said vehicles electrical operating system is other that 12 volt DC.

4. A forward facing brake light apparatus as described in claim 1 wherein the light bulb, by said wire connecting means, is connected to the normally open side of a rear brake light activating switch or mechanism.

5. A forward facing brake light apparatus as described in claim 1 wherein the light glows continuously as a brake is applied and ceases to do so when a brake is released and is in no way connected to a turn signal flasher unit.

* * * * *